United States Patent [19]
Wycoff

[11] 3,771,060

[45] Nov. 6, 1973

[54] TONE OPERATED SINGLE SIDE BAND COMMUNICATION SYSTEM

[76] Inventor: Keith H. Wycoff, P.O. Box 308, Lexington, Nebr. 68850

[22] Filed: July 26, 1971

[21] Appl. No.: 165,475

[52] U.S. Cl. .................................................. 325/50
[51] Int. Cl. .............................................. H04b 1/68
[58] Field of Search ................... 325/50, 55, 49, 64, 325/137, 138, 329, 330, 392, 466, 467; 343/228; 340/171 R; 317/138, 147

[56] References Cited

UNITED STATES PATENTS

| | | | |
|---|---|---|---|
| 3,597,690 | 8/1971 | Wycoff | 325/55 X |
| 3,204,045 | 8/1965 | Tuthill | 179/41 A |
| 3,613,004 | 10/1971 | Wycoff | 325/55 |
| 3,513,399 | 5/1970 | Wycoff | 340/171 R |
| 3,182,259 | 5/1965 | Holder | 325/50 |
| 3,088,070 | 4/1963 | Robel | 325/49 |

*Primary Examiner*—Robert L. Griffin
*Assistant Examiner*—F. Konzem
*Attorney*—Curtis F. Prangley et al.

[57] ABSTRACT

The system has a transmitter which transmits at least one pair of simultaneous tones that last for a predetermined duration followed by a voice message. The receiver in the system has a process circuit to detect the tones and the voice message, which voice message is applied to an audio circuit for conversion into sound waves. The tones are mixed to provide sum and difference frequency signals. Preferably, a low-pass filter is provided to pass only the difference frequency signal to a narrow band-pass, highly-selective tuned circuit. If the frequency of the difference frequency signal matches that of the tuned circuit, there will be provided a signal of increased amplitude for actuating an electronic switch. In the presence of that signal, the electronic switch will render the audio circuit operative to reproduce the voice message.

10 Claims, 5 Drawing Figures

Inventor
KIETH H. WYCOFF
BY Prangley, Clayton, Mullin, Dithmar & Vogel. ATTYS.

TONE OPERATED SINGLE SIDE BAND COMMUNICATION SYSTEM

The present invention is directed to communication systems, and particularly to a single side-band communication system, wherein the audio circuitry is rendered operative in the presence of predetermined tones.

It is an important object of the present invention to provide an improved single, side-band communication system in which the audio circuitry is activated by the presence of at least one pair of simultaneous tones.

Another object of the invention is to minimize the passband of the single side-band receiver, in order, first, to minimize that portion of the frequency spectrum taken up by an individual receiver and, second, to maximize the signal-to-noise ratio of the receiver.

In connection with the foregoing object, it is still another object of the invention to provide tones with frequencies within the voice spectrum.

Yet another object is to provide an encoder and decoder which are so constructed as to enable their use with virtually any single side-band transmitter.

A further object is to minimize the effects of frequency shift in a single side-band, tone-operated receiver by transmitting a pair of simultaneous tones which are mixed in the receiver, thereby canceling drift in the frequencies of the tones caused by the reinserted carrier error.

In summary, there is provided a communication receiver for receiving modulated incoming signals including at least two simultaneous tones lasting for a predetermined duration followed by a voice message, the receiver comprising a processing circuit for receiving the incoming signals and detecting the tones and the voice message therein, an audio circuit coupled to the processing circuit and including a speaker for converting the voice message into sound waves, a mixer coupled to the processing circuit for mixing the tones to provide high and low frequency signals with frequencies respectively equal to the sum and difference of the frequencies of the tones, a tuned circuit coupled to the mixer and tuned to the frequency of one of the mixed signals and responsive to the presence thereof to provide an output signal, and electronic switching means coupled to the tuned circuit and responsive to the output signal for providing an enabling signal which extends beyond termination of the tones, the audio circuit being coupled to the electronic switching means and being rendered operative in the presence of the enabling signal to furnish sound waves in accordance with the voice message and rendered inoperative in the absence of the enabling signal.

In a preferred form, the tuned circuit is responsive to the low frequency signal, and a low-pass filter is inserted between the mixer and the tuned circuit to permit passage only of the low frequency signal.

With the foregoing and other objects in view, which will appear as the description proceeds, the invention consists of certain novel features and a combination of parts hereinafter fully described, illustrated in the accompanying drawings, and particularly pointed out in the appended claims, it being understood that various changes in the details of the circuitry may be made without departing from the spirit or sacrificing any of the advantages of the invention.

For the purpose of facilitating an understanding of the invention, there is illustrated in the accompanying drawings a preferred embodiment thereof, from an inspection of which, when considered in connection with the following description, the invention, its mode of construction, assembly and operation, and may of its advantages should be readily understood and appreciated.

Figure 1:
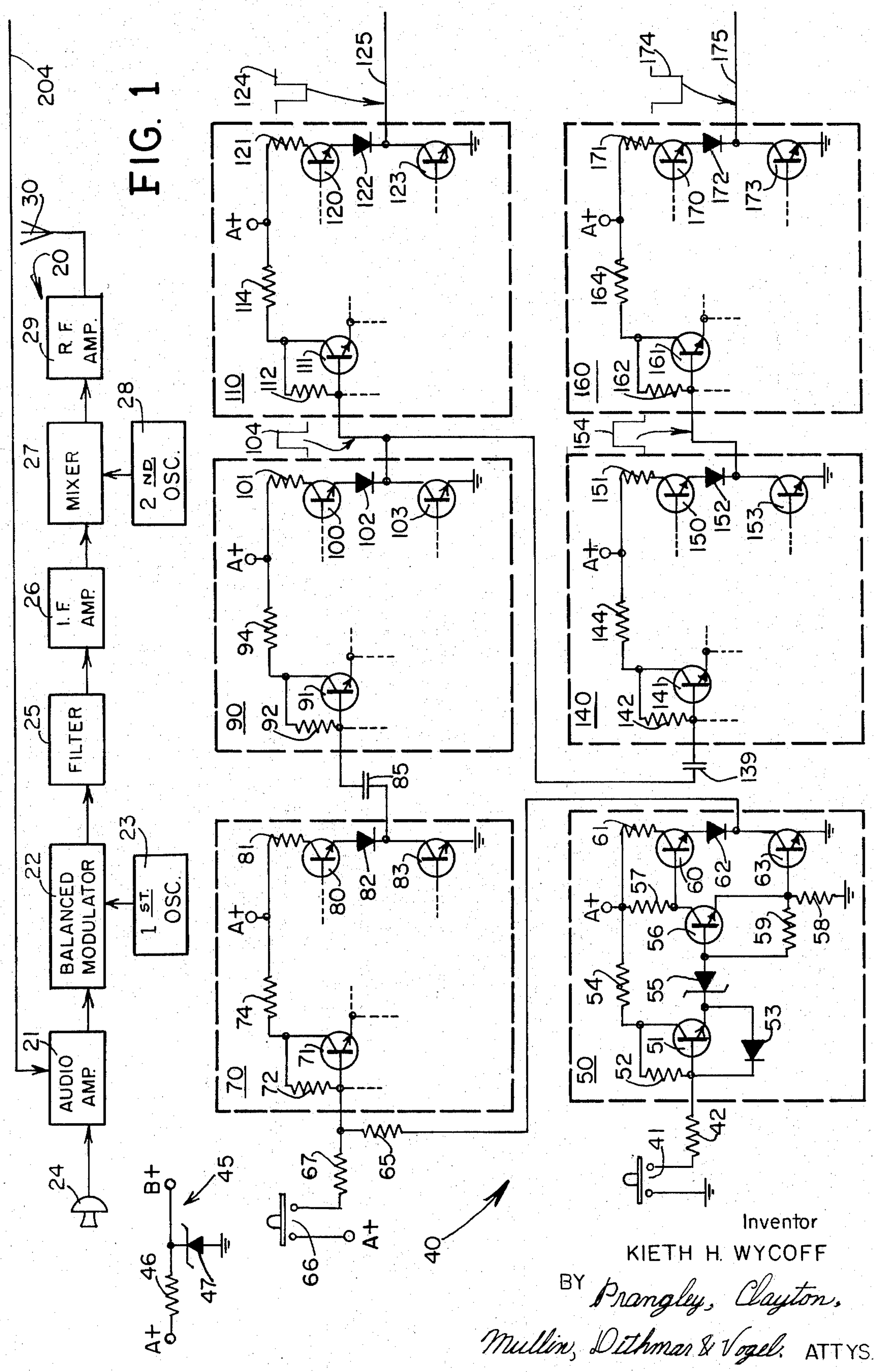
FIGS. 1 and 2 illustrate a transmitter, partially in block and partially in schematic, used in the communication system incorporating the features of the invention.
Figure 2:
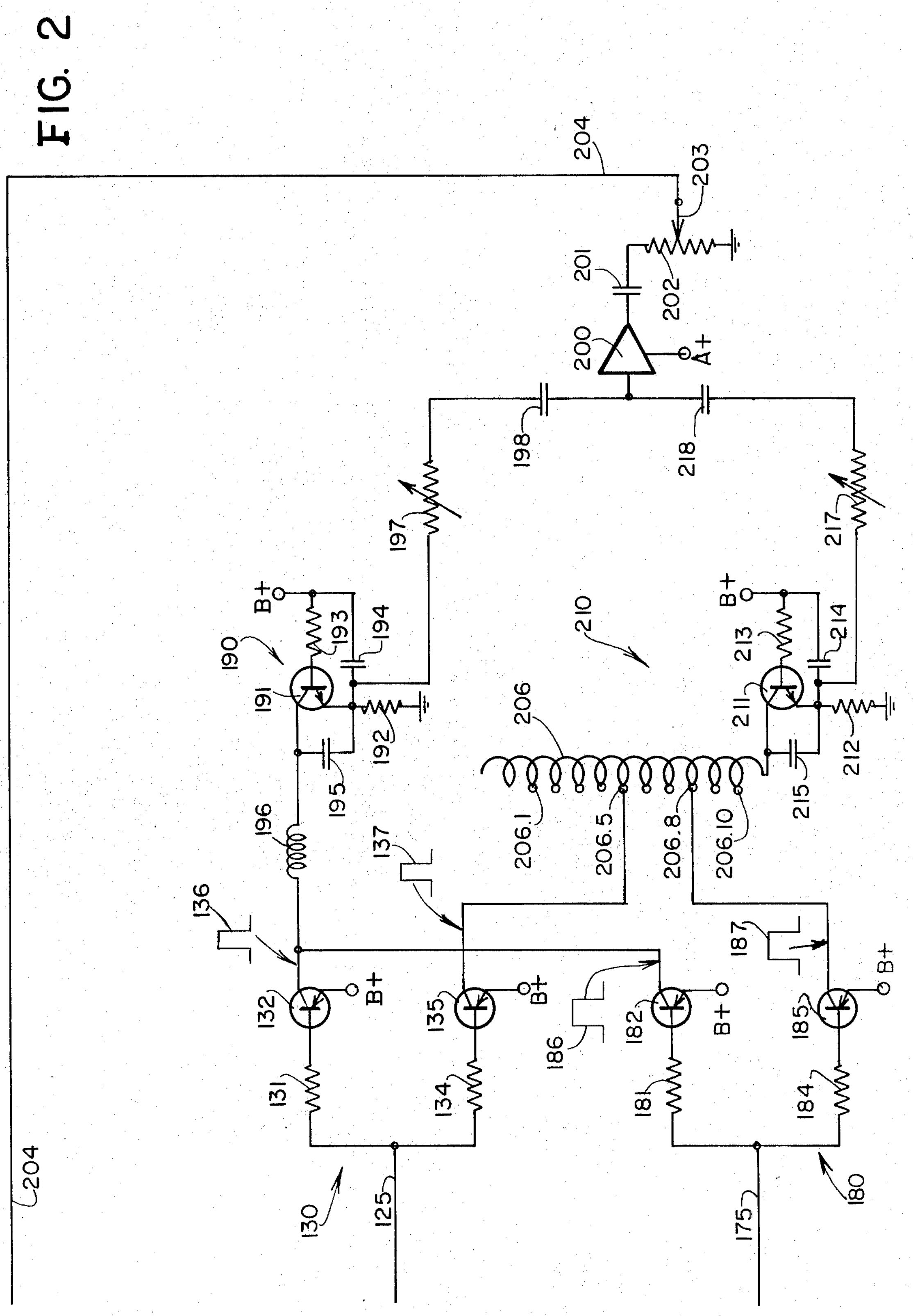

Referring now to the drawings, and more particularly to FIG. 1 thereof, there is shown a single side-band transmitter 20 for transmitting single side-band signals with a suppressed carrier. The transmitter 20 includes an audio amplifier 21 for applying an audio signal to a balanced modulator 22, the modulator 22 having a second input to which is applied an oscillatory signal derived from a first oscillator 23. The balanced modulator 22 mixes the audio signal (the modulation frequencies) and the oscillatory signal (the carrier wave), and passes the sum and difference frequencies. The modulation frequencies are attenuated substantially because of the band-pass characteristics of the modulator 22, and the carrier wave is balanced out electronically. The modulation components may either be in the form of a voice message applied to the audio amplifier 21 by way of the microphone 24 or from a tone generator 40 to be described in detail hereinafter.

The upper and lower side bands produced in the balanced modulator are applied to a filter 25 which passes only a selected one of the side bands, the selected side band being amplified in an IF amplifier 26. The amplified IF signal is applied to a mixer 27 which also receives a higher frequency, second oscillatory signal from the second oscillator 28, thereby to provide a modulated signal at radio frequencies. The RF signal is amplified in an RF amplifier 29 and is radiated by an antenna 30. The elements just described are elements well-known in the art, so that further description thereof is unnecessary. Also, it is to be understood that any suitable alternative transmitter capable of single side-band transmission is contemplated.

Turning now to the tone generator 40, there is provided a power supply 45 having a Zener diode 47 and a resistor 46 coupled in series therewith to an A+ source of supply voltage, which may be a battery, for example. Accordingly, a reduced B+ supply voltage is available across the Zener diode 47. In one form of the invention, the A+ supply voltage was 12 volts and the Zener diode was of a 9-volt variety, so that the B+ supply voltage was 9 volts. Also, the tone generator 40 has a switch 41, which, in the form shown, is depressible and has a normally-open condition, the switch 41 being coupled between ground reference potential and a resistor 42, to a first switch circuit 50. The first switch circuit 50 includes a first NPN transistor 51, with a resistor 52 coupled between the collector and base thereof. A diode 53 is coupled between the emitter and the base of the transistor 51, the collector thereof being coupled through a resistor 54 to the A+ supply voltage. The emitter of the transistor 51 is coupled by way of a Zener diode 55 to the base of a second NPN transistor 56, the collector of which is coupled through a resistor 57 to the A+ supply voltage, and the emitter of which is coupled by way of a resistor 58 to ground reference potential. A resistor 59 is coupled between the base and emitter of the transistor 56. A third NPN transistor 60 has its base coupled to the collector of the transistor 56, its collector coupled to the A+ operating voltage by means of a resistor 61, and its emitter coupled through a diode 62 to the collector of a fourth NPN transistor 63. The base of the transistor 63 is coupled to the junction of the resistors 58 and 59, and the emitter is coupled to ground reference potential.

When the power supply 45 is energized to provide the A+ supply voltage for the first switch circuit 50, the transistors 51, 56, and 63 are all rendered conductive, thereby effectively to ground (except for the saturation resistance between the collector and emitter) the collector of the transistor 63. The transistor 56 shunts current away from the transistor 60, whereby the latter is rendered non-conductive. When the switch 41 is actuated, the base of the transistor 51 is effectively grounded through the resistor 42, thereby shunting less current away from the transistor 51 and rendering it non-conductive, which, in turn, renders nonconductive the transistors 56 and 63. Since the transistor 56 is no longer conductive, current will flow through the resistor 57 into the transistor 60, thereby rendering the same conductive and causing the A+ voltage, minus the small drop across the resistor 61, the transistor 60, and the diode, to appear on the collector of the transistor 63. Summarizing, if no voltage is applied to the input, that is, to the base of the transistor 51, the output voltage of the switch circuit 50 will be zero, that is, the collector of the transistor 63 will be on ground. For convenience, in future reference, the grounded condition of the output of a switch circuit will be referred to as yielding a zero voltage despite the fact that the voltage is somewhat higher because of the saturation resistance of a transistor. Similarly, a positive voltage at the input of the switch circuit 50 will cause an increase in conduction of the transistor 51, but the output voltage will still be zero. If the input to the switch circuit 50 is grounded, that is, if a zero voltage is applied thereto, the output of the switch circuit 50 will be a positive voltage slightly less than the A+ voltage. Thus, it may be seen that the switch circuit 50 may be considered an inverter, that is, if the input is zero voltage, the output will be a plus voltage, and, if the input is a plus voltage, the output will be zero voltage.

The output of the first switch circuit 50, that is, the collector of the transistor 63 is coupled by way of a resistor 65 to a second switch circuit 70. Also coupled to the input of the second switch circuit 70 is a resistor 67 coupled in series with a normally-open switch 66 to the A+ supply voltage. The second switch circuit 70 has precisely the same construction as the first switch circuit 50, and the parts are therefore numbered with corresponding numbers, but with 20 added thereto. In the interest of simplifying the drawing, only the input and output of the switch circuit 70 are illustrated.

Prior to actuating the switch 41, the collector of the transistor 63 is effectively grounded, so as to divert current from the transistor 71 in the second switch circuit 70. Thus, the transistors 71 and 83 will be rendered nonconductive, and the output of the second switch circuit 70 will be a plus voltage. Actuation of the switch 41, to ground the input of the first switch circuit 50, causes the output thereof to provide the plus voltage, as previously explained, which causes the transistors 71 and 83 to conduct, thereby grounding the output of the second switch circuit 70, so that it supplies a zero voltage. The same results can be accomplished by actuating the switch 66, which would apply the A+ voltage directly to the transistor 71, thereby rendering it and the transistor 83 conductive, to cause a zero voltage to appear at the output of the second switch circuit 70. Thus, actuation of either of the switches 41 or 66 has the same net effect of providing a zero voltage in the output of the second switch circuit 70.

The output of the second switch circuit 70, that is, the collector of the transistor 83, is coupled by way of a capacitor 85 to a third switch circuit 90. The switch circuit 90 has the same construction as the switch circuit 50 and has corresponding numbers, but with 40 added. Again, in the interest of simplifying the drawing, there are shown only the input of output stages of the switch circuit 90.

Before either of the switches 41 or 66 is actuated, the transistors 91 and 103 are conducting, so that the output of the third switch circuit 90 is a zero voltage. When either of the switches 41 or 66 is actuated, the transistor 83 in the second switch circuit 70 becomes heavily conductive, to cause current flow through the resistors 92 and 94 to be diverted from the transistor 91 and through the capacitor 85 and the collector and emitter of the transistor 83. Accordingly, the transistor 91 is rendered nonconductive as is the transistor 103, to cause the output of the switch circuit 90 to rise to the plus voltage. When the capacitor 85 has become charged, further current flow through the resistors 92 and 94 is applied to the transistor 91 to render the same conductive and therefore render the transistor 103 conductive.

Thus, a positively-directed pulse 104 appears at the output at the third switch circuit 90, that is, on the collector of the transistor 103. The leading edge of the pulse 104 occurs at the time that the transistor 83 becomes conductive, which occurs essentially simultaneously with actuation of either of the switches 41 or 66. The capacitor 85 and the resistors 92 and 94 define a time constant network, the values of which control the duration of the pulse 104.

The output of the third switch circuit 90 is coupled to a fourth switch circuit 110 which has a construction identical to the switch circuit 50, with corresponding numerals, but with 60 added thereto. Again, for simplicity purposes, only a portion of the switch circuit 110 is illustrated. When the collector of the transistor 103 in the third switch circuit 90 is at the plus voltage for the duration of the pulse 104, the transistor 111 and, thus, the transistor 123 are conductive, effectively grounding the collector of the transistor 123, thus furnishing a negatively-directed pulse 124 on the conductor 125. The conductor 125 is coupled to a splitter circuit 130, which circuit includes an isolating resistor 131 coupled to the base of a PNP transistor 132. The emitter of the transistor 132 is coupled to the B+ supply voltage and the collector is coupled to a first oscillator 190. There is provided another isolating resistor 134 coupled to the conductor 125 and a second PNP transistor 135 having its base coupled to the resistor 134. The collector of the transistor 135 is coupled to a second oscillator 210, which will be described presently. The negatively-directed pulse 124 renders the transistors 132 and 135 conductive so as to furnish upon the respective collectors positively-directed pulses 136 and 137 having durations equal to the duration of the pulse 124.

The output of the third switch circuit 90 is also coupled to a fifth switch circuit 140 by way of a capacitor 139, which switch circuit 140 is substantially identical to the switch circuit 50 and is labeled with corresponding numbers, but with 90 added thereto.

Prior to the appearance of the pulse 104, the transistors 141 and 153 are conducting, so that the output of the fifth switch circuit 140 is a zero voltage. The leading edge of the pulse 104 from the third switch circuit 90 is coupled through the capacitor 139 to the transistor 141 in the switch circuit 140. Since the leading edge is rising, it only increases conduction of the transistor 142, but does not affect the output of the circuit 140. The trailing edge of the pulse 104 occurs when the transistor 103 in the switch circuit 90 becomes conductive to cause current from the A+ supply voltage through the resistor 142 and 144 to be diverted from the transistor 141, through the capacitor 139 and the collector and the emitter of the transistor 103. When the capacitor 139 becomes charged, the current will no longer become diverted through the transistor 103, but, instead, will again be delivered to the transistor 141 to render the same conductive. Thus, the transistor 141 becomes nonconductive, as does the transistor 153. The rate of charge of the capacitor 139 is determined by the values of the resistors 142 and 144 and the capacitor 139. Thus, a positively-directed pulse 154 appears at the output of the fifth switch circuit 140, that is, on the collector of the transistor 153. The leading edge of the pulse 154 occurs essentially simultaneously with the termination of the pulse 104. The capacitor 139 and the resistors 142 and 144 define a time constant network, the values of which control the duration of the pulse 154.

The output of the fifth switch circuit 140 is coupled to a sixth switch circuit 160 which has a construction identical to the switch circuit 50, with corresponding numerals, but with 110 added thereto. Again, for simplicity purposes, only a portion of the switch circuit 160 is illustrated. When the collector of the transistor 153 in the fifth switch circuit 140 is at plus voltage for the duration of the pulse 154, the transistor 161 and, thus, the transistor 173 are rendered conductive, effectively grounding the collector of the transistor 173, thus furnishing a negatively-directed pulse 174 on the conductor 175. In a particular form of the invention, the circuits 50, 70, 90, 110, 140, and 160 constituted a single integrated circuit.

The conductor 175 is coupled to a splitter circuit 180, which circuit includes an isolating resistor 181 coupled to the base of a PNP transistor 182. The emitter of the transistor 182 is coupled to the B+ supply voltage, and the collector is coupled to the first oscillator 190. There is provided another isolating resistor 184 coupled to the conductor 175 and a second PNP transistor 185 having its base coupled to the resistor 184. The collector of the transistor 185 is coupled to the second oscillator 210. The negatively-directed pulse 174 renders the transistors 182 and 185 conductive so as to furnish upon the respective collectors positively-directed pulses 186 and 187 having durations equal to the duration of the pulse 174.

Thus, when either of the switches 41 or 66 is actuated, the simultaneous pulses 136 and 137, each of the same predetermined duration, are produced, followed automatically by a second pair of simultaneous pulses 186 and 187, each of which lasts for another predetermined duration, there being virtually no time lag between the termination of the pulses 136 and 137 and the commencement of the pulses 186 and 187.

The pulses 136 and 186 are coupled to the first oscillator 190 which includes an NPN transistor 191 having its base coupled through a resistor 193 to the B+ supply and its emitter coupled through a resistor 192 to ground reference potential. A pair of capacitors 194 and 195 is coupled in series between the collector of the transistor 191 and the B+ supply voltage. There is provided a connection between the emitter of the transistor 191 and the junction of the capacitors 194 and 195. A coil 196 couples the collector of the transistor 191 to the collectors of the transistors 132 and 182. The junction of the capacitors 194 and 195 is coupled through a variable resistor 197 and a capacitor 198 to an amplifier 200. The output of the amplifier 200 is coupled to the series combination of a capacitor 201 and a potentiometer 202 having a movable arm 203.

In the absence of the pulses 136 and 186, no supply voltage is furnished for the collector of the transistor 191, whereby the oscillator 190 does not produce an oscillatory signal or tone. The appearance of the pulse 136 renders the oscillator 190 operative to produce an oscillatory signal or tone for the duration of the pulse 136, which oscillatory signal is coupled through the resistor 197 and the capacitor 198 to the amplifier 200. Upon the termination of the pulse 136, the pulse 186 commences, as previously explained. Thus, the oscillator 190 is maintained operative for the further duration of the pulse 186 to produce the oscillatory signal or tone. The variable resistor 197 enables adjustment of the amplitude of the tone.

The pulses 137 and 187 are coupled to a second oscillator 210 which includes an NPN transistor 211 having its base coupled through a resistor 213 to the B+ supply and its emitter coupled through a resistor 212 to ground reference potential. A pair of capacitors 214 and 215 is coupled in series between the collector of the transistor 211 and the B+ supply voltage. There is provided a connection between the emitter of the transistor 211 and the junction of the capacitors 214 and 215. A coil 206 having a plurality of taps 206.1 through 206.10 is coupled to the collector of the transistor 211. In the embodiment shown, the tap 206.5 is coupled to the collector of the transistor 135 and the tap 206.8 is coupled to the collector of the transistor 185. The junction of the capacitors 214 and 215 is coupled through a variable resistor 217 and a capacitor 218 to an amplifier 200.

In the absence of the pulses 137 and 187, no supply voltage is furnished for the collector of the transistor 211, whereby the oscillator 210 does not produce an oscillatory signal or tone. The appearance of the pulse 137 renders the oscillator 210 operative to produce an oscillatory signal or tone for the duration of the pulses 137, which oscillatory signal has a frequency determined by the capacitors 214 and 215 and the portion of the coil 206 between the collector of the transistor 211 and the tap 206.5. The oscillatory signal or tone is coupled through the resistor 217 which permits adjustment of the tone amplitude and the capacitor 218 to the amplifier 200. Upon termination of the pulse 137, the pulse 187 commences, whereby the frequency of the oscillatory signal produced by the oscillator 210 is determined by the same capacitors 214 and 215 and a lesser inductance, that is, the portion of the coil 206 between the collector of the transistor 211 and the tap 206.8. The oscillatory signal produced for the duration of the pulse 187 is coupled by the resistor 217 and the capacitor 218 to the amplifier 200.

The amplifier 200 amplifies the various oscillatory signals or tones applied thereto and couples them via the capacitor 201 to the potentiometer 202. Thus, there appears across the potentiometer 202 a first tone having a frequency determined by the parts 194, 195, and 196 simultaneously with a second tone having a second frequency determined by the parts 214, 215, and the portion of the coil 206 to the tap 206.5. The second tone terminates with the termination of the pulse 137, but the first tone is continuously produced by virtue of the pulses 136 and 186. A third tone, having a frequency determined by the parts 214, 215, and the portion of the coil 206 to the tap 206.8, is produced during the pulse 187. There is provided, therefore, a continuous first tone, a second tone occurring simultaneously with the first portion of the first tone, and a third tone occurring simultaneously with the last portion of the first tone.

It should be understood that the first oscillator 190 could be replaced with an oscillator similar to the oscillator 210, so that the tone produced thereby during the first pulse 136 differs from the tone produced thereby during the second pulse 186. The circuit shown is preferable because of its simplicity. By selecting the taps on the coil 206 to which the transistors 135 and 185 are connected, the frequencies of the tones may be determined. If used in a base station, a switch may be connected between the transistors 135 and 185 and the taps on the coil 206 to enable rapid selection of the tones. In a transmitter actually constructed, the duration of the tone from the oscillator 190 was 325 milliseconds, the duration of the first tone from the oscillator 210 was approximately 200 milliseconds, and the duration of the second tone from the oscillator 210 was 125 milliseconds. All tones produced by the oscillators 190 and 210 in the voice spectrum, that is, between the range of about 350 Hz to 2,750 Hz. The oscillator 190 produced a tone at 2,450 Hz.

The tones were applied via the conductor 204 to the audio amplifier 121 which couples the tones to the balanced modulator 22. The tones will actuate a specific receiver, as will be subsequently described. Thus, if the operator wishes to communicate with the specific receiver, the connections to the coil 206 are made by switch, for example, and then the operator actuates the switch 41 or the switch 66, either of which would constitute a push-to-talk switch. That causes a pair of simultaneous tones immediately followed by a second pair of simultaneous tones to be impressed upon the balanced modulator 22. The tones, after being modulated on a single side band, are transmitted to actuate the selected receiver. Since the tones are only sent for a very short duration, in this example, 325 milliseconds, the operator may begin speaking into the microphone 24 almost immediately, which voice message is transmitted by modulation components on the single side band.

Figure 3:
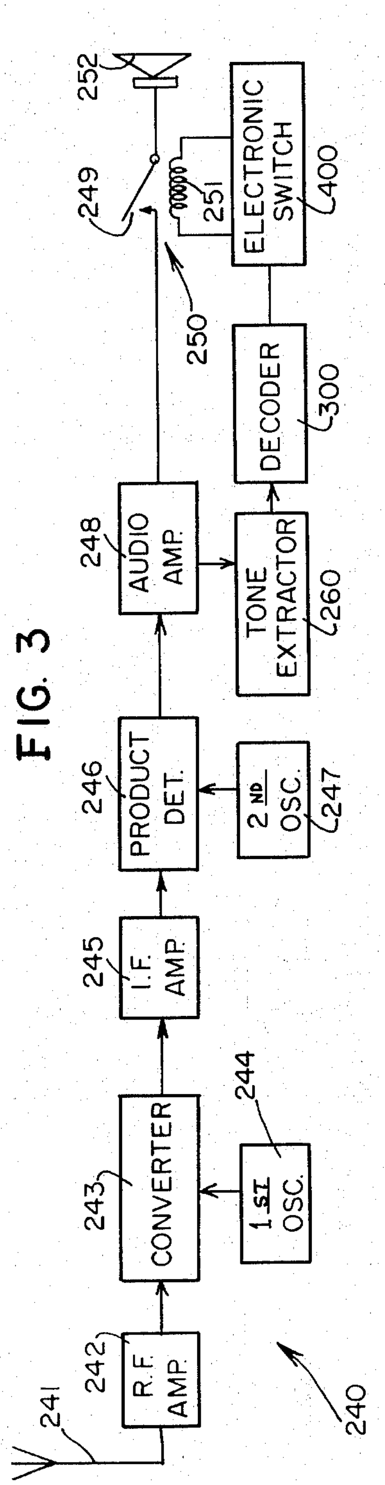
FIG. 3 is a block diagram of the receiver in the system.

Turning now to FIG. 3, there will be described the details of construction of the receiver used in the communication system incorporating the features of the present invention. The receiver 240 includes an antenna 241 which receives the signals emitted by the transmitter 20 and applies them to an RF amplifier 242. The amplified signals are applied to a convertor 243 having a second input coupled to a first oscillator 244. The RF signals from the amplifier 242 are mixed with an oscillatory signal from the oscillator 244 to provide an intermediate frequency (IF) signal which is then applied to an IF amplifier 245. The output of the amplifier 245 is coupled to a product detector 246, the latter receiving a second input from a second oscillator 247. The second oscillator 247 reinserts the carrier which was suppressed at the transmitter 20 to detect the modulation components and apply them to an audio amplifier 248. The input to the audio amplifier 248 will consist of a first pair of simultaneous tones, followed immediately by a second pair of simultaneous tones, followed by the voice message. The output of the amplifier 248 is coupled via the contacts 249 of a relay 250 (which has an energizing winding 251) to a loud speaker 252. If the contacts 249 are open, no audio signal will arrive at the speaker 252 and, accordingly, no noise or information not directed to the listener will be emitted therefrom.

The audio amplifier 248 is also coupled to a tone extractor 260. The tone extractor 260 mixes the tones in a manner to be described, to provide a signal having a frequency equal to the difference of the frequencies of the tones in the first pair, followed by a signal having a frequency equal to the difference in frequencies of the tones in the second pair. The output of the tone extractor 260 is applied to a decoder 300 which will provide an output if the two signals applied thereto are of the frequencies to which the decoder 300 is tuned. The output of the decoder 300 is applied to an electronic switch 400 which, in the presence of a signal from the decoder 300, will furnish an enabling current through the winding 251 of the relay 250, so as to close the contacts 249. Audio signals produced by the amplifier 248 are then coupled to the speaker 252 which converts them into sound waves.

Figure 4:
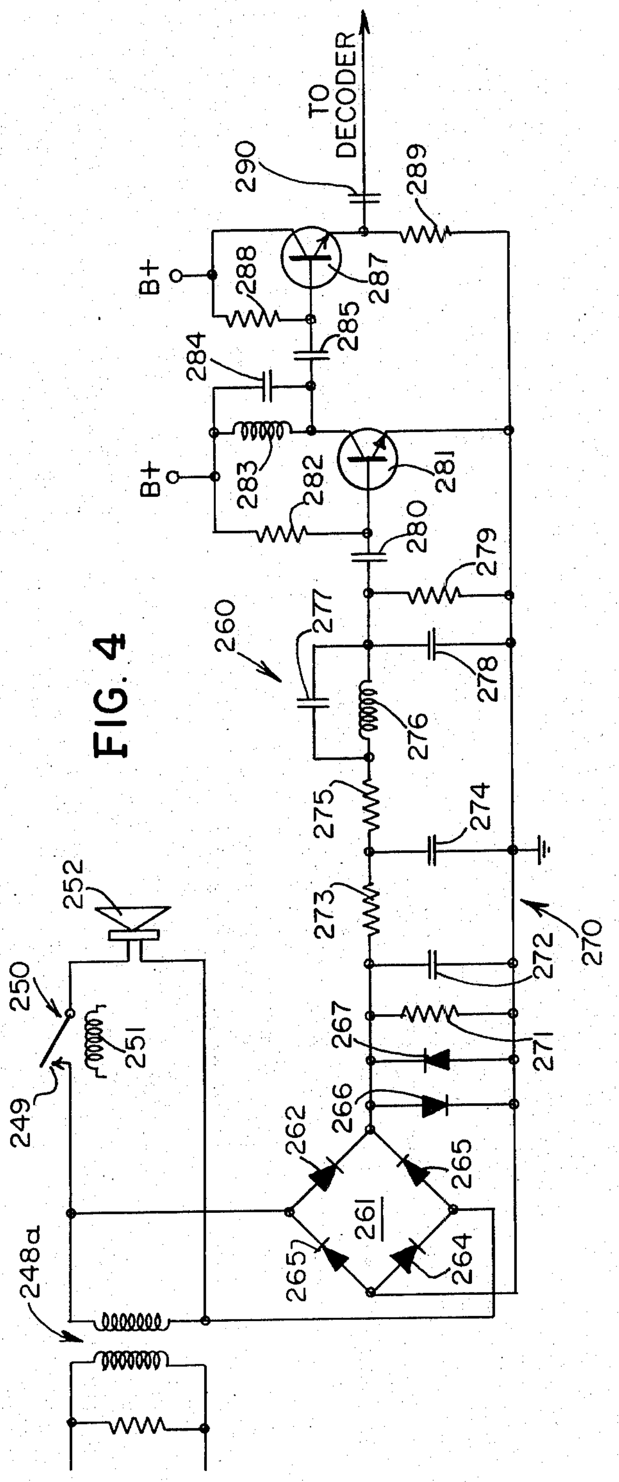
FIG. 4 is a schematic diagram of the tone extractor forming part of the receiver of FIG. 3.

Turning now to FIG. 4, the details of construction of the tone extractor 260 will be described. As is usual, the audio amplifier 248 has a transformer **248*a* to match the impedance of the amplifier stages to the impedance of the loud speaker 252. The secondary winding of the transformer 248 is coupled in series with the loud speaker 252 and the contacts 249 of the relay 250. A resistor is coupled across the primary winding of the transformer 248*a* to prevent the amplifier stages in the audio amplifier 248 from oscillating when the contacts 249** are open, so that those amplifier stages are unloaded.

The primary winding is also coupled to a detector or mixer 261 which includes four diodes 262, 263, 264, and 265 arranged as a bridge to mix the tones. A pair of oppositely-poled diodes 266 and 267 is coupled in parallel across the output of the mixer 261. There is provided a low-pass filter 270, also coupled to the output of the mixer 261, which low-pass filter 270 includes a number of stages. A resistor 271 and a capacitor 272 are coupled in parallel, providing the first stage. The second stage is achieved in a T network defined by the resistors 273 and 275 and the capacitor 274; a third stage in the form of an inductor 276 and a capacitor 277; a fourth stage in the form of a capacitor 278 and a resistor 279 coupled in parallel; and a fifth stage consisting of a series capacitor 280 and a shunt resistor 282. There is also provided a stage of amplification in the form of an NPN transistor 281 biased by the resistor to B+. There is provided a second NPN transistor 287 connected as an emitter follower, so as to match the impedance of the low-pass filter 270 to the input impedance of the decoder 300. Further filtering is provided by the tuned circuit consisting of an inductor 283 and a capacitor 284, a series capacitor 285, and a shunt resistor 288. The output from the filter appears across an emitter load resistor 289 and is coupled via a capacitor 290 to the decoder 300.

In operation, there appears across the secondary winding of the transformer 248*a* a first simultaneous pair of tones which are mixed in the mixer 261 to provide a signal having a frequency of one of the tones in the first pair, another signal having a frequency equal to the frequency of the other of the tones in the first pair, still another signal having a frequency equal to the difference of frequencies of the tone in the first pair, and yet another signal having a frequency equal to the sum of the frequencies in the tones in the first pair. Similarly, there also appears across the second winding of the transformer 248*a* a second simultaneous pair of tones which are mixed in the mixer 261 to provide a signal having a frequency of one of the tones in the second pair, another signal having a frequency equal to the frequency of the other of the tones in the second pair, still another signal having a frequency equal to the difference of frequencies of the tones in the second pair, and yet another signal having a frequency equal to the sum of the frequencies in the tones in the second pair. The amplitudes of the signals from the mixer 261 are limited by the diodes 266 and 267.

The elements in the low-pass filter 270 are selected to cause the cutoff frequency thereof to be greater than the frequency equal to the difference in frequency between any pair of tones, but less than the frequency of any individual tone. Thus, the cutoff frequency is less than the frequency equal to the sum of the frequencies of any two simultaneous tones. Accordingly, the low-pass filter 270 passes only a first signal having a frequency equal to the difference in frequencies between the tones in the first pair, followed by a second signal having a frequency equal to the difference in frequency between the tones in the second pair. The two signals that are passed are amplified in the transistor 281 and coupled by way of the emitter follower transistor 287 and through the capacitor 290 to the decoder 300.

Figure 5:
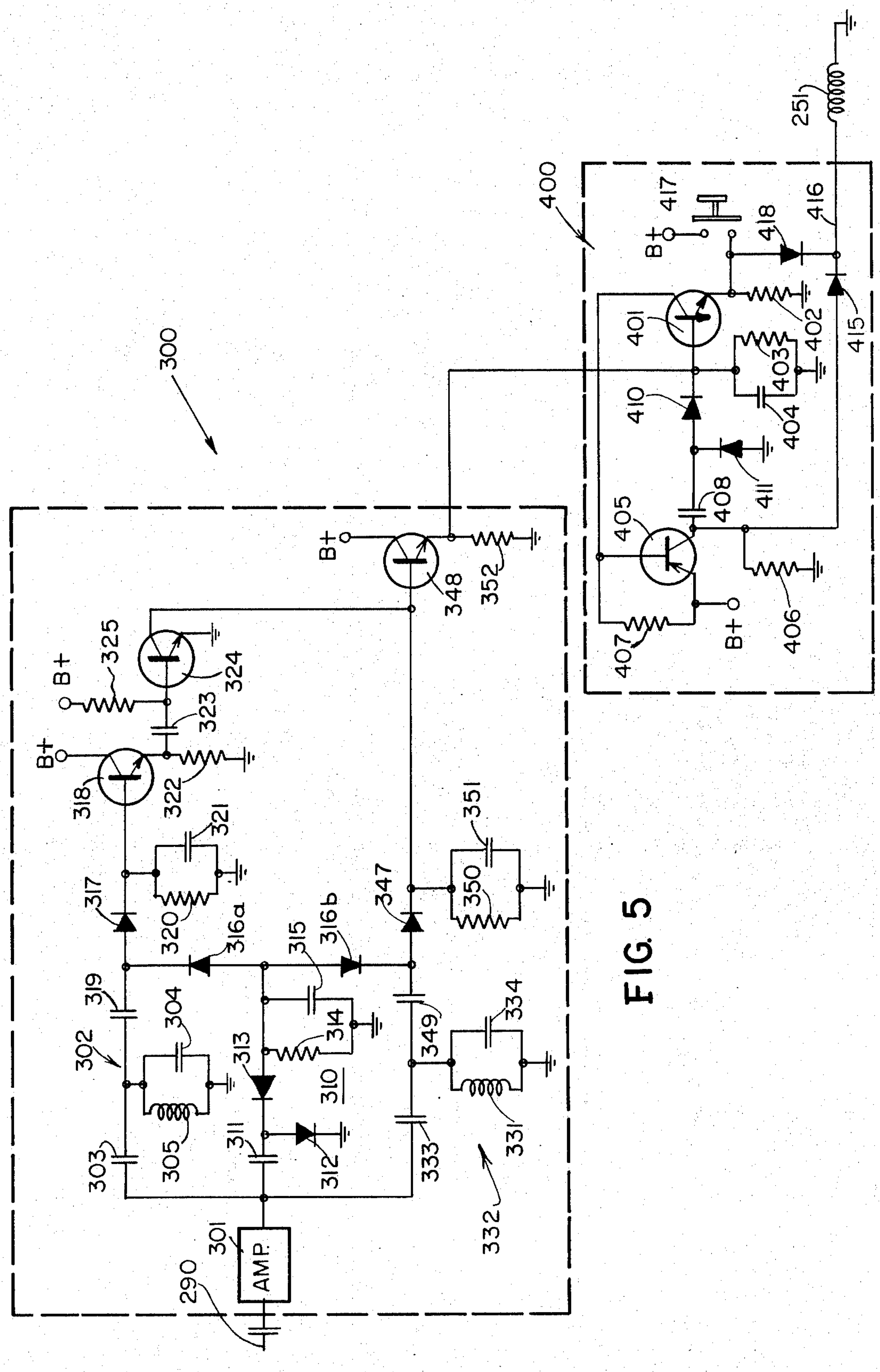
FIG. 5 is a schematic of the decoder and the electronic switch of the receiver of FIG. 3.

Turning now to FIG. 5, the details of the decoder 300 will be described. The decoder 300 includes an amplifier 301 which is coupled to the capacitor 290 and having its output coupled to a tone filter 302. The tone filter 302 includes capacitors 303 and 304 coupled in series and an inductor 305 coupled in parallel with the capacitor 304. The decoder 300 further comprises a reference circuit 310 including an input capacitor 311 coupled to the output of the amplifier 301 and a diode 312 coupled to ground. There is also provided a diode 313 connected to the junction of the capacitor 311 and the diode 312. A filtering network comprises a resistor 314 and a capacitor 315 coupled in parallel to ground. There is also provided a rectifying circuit including a pair of diodes 316*a* and 317 coupled in series to the base of a switching transistor 318. A capacitor 319 is coupled between the junction of the capacitors 303 and 304 and the junction of the diodes 316*a* and 317. There is also provided a resistor 320 and a capacitor 321 for filtering of the rectified voltage, the resistor 320 also providing a DC return for the base of the transistor 318. The transistor 318 is connected as an emitter follower, the emitter being coupled to a load resistor 322 connected to ground reference potential. The emitter of the transistor 318 is coupled by way of a capacitor 323 to an NPN transistor 324, the emitter of which is grounded and the base of which is coupled to the B+ supply voltage by way of a resistor 325.

There is also provided a second filter circuit 332 which includes capacitors 333 and 334 coupled in series and an inductor 331 coupled in parallel with the capacitor 334. Also, the reference circuit 310 includes a second diode 316*b* which is coupled in series with a diode 347 to the base of the switching transistor 348. A capacitor 349 is coupled between the junction of the capacitors 333 and 334 and the junction of the diodes 316*b* and 347. There is also provided a resistor 350 and a capacitor 351 for filtering of the rectified voltage, the resistor 350 also providing a DC return for the base of the transistor 348. The transistor 348 is connected as an emitter follower, the emitter being coupled to a load resistor 352 connected to ground reference potential, the collector being coupled to the B+ supply voltage. The base of the transistor 348 is also coupled back to the collector of the transistor 324.

Prior to reception of any tones, the transistor 324 is conducting by virtue of the forward bias provided by the current flow through the resistor 325. Thus, the base of the transistor 348 is effectively grounded to prevent amplification of a tone thereby. If tones are received, they are applied to the amplifier 301, which amplifier has sufficient gain to cause the tones therefrom to be clipped or limited so the signal strength at the antenna 241 does not affect the amplitude of the signals applied to the filters 302 and 332.

The amplified signal from the amplifier 301 containing the tones and noise will be filtered in the reference circuit 310 and will be rectified thereby to provide a reference voltage on the anode of the diode 316*a*. If the signal from the amplifier 301 includes the tone to which the filter 302 is tuned, the filter 302 will develop its maximum voltage which is applied to the cathode of the diode 316*a*. In order that the diode 316*a* may conduct to provide an output, the tone appearing at the cathode thereof must have a peak-to-peak value in excess of the reference voltage on the anode of the diode 316*a*. The rectified voltage, after being filtered by the resistor 320 and the capacitor 321, is applied to the base of the transistor 318 so as to render it conductive. Current flows from the B+ supply through the collector and the emitter of the transistor 318, through the capacitor 323 and the base-emitter junction of the transistor 324. Since the transistor 324 is already conducting, the presence of the tone has little effect. When the first signal terminates because of termination of the first pair of tones, the capacitor 323 discharges through the resistor 322 to render nonconductive the transistor 324, thereby removing the short on the base of the transistor 348. The length of time the transistor 324 is nonconductive, and, therefore, the length of time the short is removed from the transistor 348 is determined by the time constant of the resistor 322 and the capacitor 323 and the resistor 325. However, until the correct second signal is received, the transistor 348 is not rendered conductive.

When the first pair of tones terminates, the second pair of tones commences and if the frequency thereof is the frequency to which the filter 332 is tuned, the filter 332 will develop its maximum voltage which is applied via the capacitor 349 to the cathode of the diode 316*b*. In order to provide an outout from the diode 348, the signal appearing at the cathode of the diode 316*b* must have a peak-to-peak value in excess of the reference voltage on the anode of the diode 316*b*. The signal is rectified by the diodes 316*b* and 347 which, in effect, constitute a doubler circuit and filtered by the resistor 350 and the capacitor 351. If the short on the base of the transistor 348 furnished by the transistor 324 has been removed, then the rectified voltage renders the transistor 348 conductive to cause the B+ voltage (approximately) to appear on the emitter of the transistor 348. If desired, a feed-back network may be provided from the transistor 348 to the transistor 324 to maintain the latter nonconductive for the duration of the second tones. Alternatively, the time constant determined by the resistor 322 and the capacitor 323 and resistor 325 may be selected to insure that the transistor 324 is not conductive throughout the duration of the second tones.

There is provided an electronic switch 400, which, in the embodiment shown, is a monostable multivibrator and includes an NPN transistor 401 having its emitter coupled to ground via a resistor 402 and having its base coupled to ground by way of a resistor 403 and a capacitor 404 coupled in parallel. There is also provided a PNP transistor 405 having its base connected directly to the collector of the transistor 401, its collector connected through a resistor 406 to ground and its emitter connected to the source of supply voltage, a resistor 407 being connected between the base and the emitter of the transistor 405. The collector of the transistor 405 is coupled by way of a capacitor 408 and a diode 410 to the base of the transistor 401. A diode 411 is coupled between ground reference potential and the junction of the capacitor 408 and the diode 410. The emitter of the transistor 348 in the decoder 300 is coupled to the base of the transistor 401. A diode 415 couples the collector of the transistor 405 to a conductor 416. There is provided a switch 417 coupled between the source of B+ operating potential and the emitter of the transistor 401. The switch 417 is also coupled via a diode 418 to the conductor 416.

In operation, the appearance of the output signal on the emitter of the transistor 348 causes conduction of the transistor 401 which provides a path for current flow from the source of supply voltage through the base-emitter junction of the transistor 405 and the collector and the emitter of the transistor 401. This renders the transistor 405 highly conductive so as to provide current flow through its collector and its emitter and the resistor 406 and thereby cause conduction of the diode 415 to place the supply voltage on the conductor 416. The supply voltage becomes an enabling signal for causing current flow in the winding 251 of the relay 250 to close the contacts 249. The capacitor 404 must be charged before the transistor 401 will conduct. Thus, the capacitor 404 introduces a slight delay to prevent the electronic switch 400 from producing the enabling signal in the presence of a static charge. The isolating diode 410 prevents the signal from the decoder 300 from being applied to the capacitor 408. The diode 411 provides a rapid discharge path for the capacitor 408.

During the conduction period of the transistors 401 and 405, current flows from B+ through the collector and the emitter of the transistor 405, through the capacitor 408 and through the base-emitter junction of the transistor 401 to charge the capacitor 408. Accordingly, when the signal from the decoder 400 is removed by virtue of the tones terminating, the transistor 401 remains conductive because the capacitor 408 has a charge thereon, which charge leaks off through the base-emitter junction of the transistor 401 and the resistors 402 and 403. Of course, the conduction of the transistor 401 maintains the transistor 405 conductive to maintain the enabling voltage on the conductor 416 for a time interval determined by the RC time constant of the switch circuit 400, that is, the resistors 402 and 403 and the capacitor 408. By selecting the value of those parts, the time period that the enabling signal remains on the conductor 416 may be controlled.

With the relay 250 energized, audio signals from the audio amplifier 248 will be applied to the loud speaker 252 for conversions into sound waves. It is thus desirable that the RC time constant in the electronic switch circuit 400 be selected to be long enough to maintain the contacts 249 closed for the duration of audio information. The switch 417 is provided to enable the user to "override" the timing function by rendering nonconductive the transistors 401 and 405. The B+ supply voltage is then directly applied through the diode 418 to energize the relay winding 251, whereby the contacts 245 will remain closed as long as the switch 417 is energized.

Summarizing, if the operator of the transmitter 20 wishes to alert the user of the receiver 240, the operator connects the transistor 135 to a tap on the coil 206 in the oscillator 210 such that the difference in frequency between the tones produced by the oscillator 190 and the oscillator 210 is the frequency to which the filter 302 is tuned. The transistor 185 is connected to a tap on the coil 206 such that the difference in frequency between the tone produced by the oscillator 190 and the tone produced by the oscillator 210 is equal to the frequency to which the tuned circuit 332 is tuned. By actuating his push-to-talk switch, which may be either of the switches 41 or 66, the operator will cause the tones to be modulated as single side-band components. The tones are received by the receiver 240, processed by elements 242, 243, 245, and 246 and applied to the audio amplifier 248. The mixer 261 first mixes the first pair of tones (the tone produced by the oscillator 190 and the tone first produced by the oscillator 210) and thereafter mixes the second pair of tones (the tone produced by the oscillator 190 and the tone next produced by the oscillator 210), to provide sum and difference frequency signals for each. The low-pass filter 270 allows only signals representative of the difference in frequency between each pair of tones to be applied to the decoder 300. Since the first tuned circuit 302 is tuned to the frequency of the first signal, the transistor 324 will be rendered nonconductive to remove the short on the base of the transistor 348. Since the second signal has a frequency corresponding to that to which the tuned circuit 332 is tuned, the transistor 348 will be rendered conductive to provide an output signal for application to the electronic switch circuit 400. The electronic switch circuit 400 in response thereto will produce an enabling signal on the conductor 416 which extends beyond termination of the last pair of tones in the sequence of tones, the duration beyond termination being determined by the RC time constant of the circuit 400. The enabling signal energizes the relay 250. Since the relay 250 becomes energized during the presence of the last pair of tones, the user of the receiver 240 will hear the same from the loud speaker 252. This is advantageous in that it alerts the user of an impending message. All of this takes a very short period of time, for example, 350 milliseconds, so that the operator of the transmitter 20, immediately upon actuation of the push-to-talk switch, may speak. The voice message is processed in the receiver and is coupled to the loud speaker 252 since the relay 250 is energized.

As previously pointed out, the tones produced by oscillators 190 and 210 in the transmitter 20 have frequencies within the voice spectrum, that is, within the range of about 350 Hz to 2,800 Hz. This is desirable, first to minimize the portion of the frequency spectrum required by an individual communication system. Because the tone frequencies are within the voice spectrum, the extent of the frequency spectrum needed is minimized. Secondly, utilizing tones only within the voice spectrum narrows the passband to which the receiver 240 must respond. Basically, the narrower the passband of the receiver, the better the signal-to-noise ratio thereof.

The transmission of a pair of simultaneous tones compensates for any drift that may occur either in the frequencies of the tones themselves or in the suppressed carrier. Thus, for example, if the first tone is 2,500 Hz and the second tone is 1,800 Hz, the difference will be 700 Hz. If a downward 100 Hz frequency drift occurs, so that the first tone had a frequency of 2,400 Hz, the second tone would similarly drift to 1,700 Hz, and the difference would still be 700 Hz.

Although the voice spectrum is about 350 Hz to about 2,800 Hz, which would therefore be the required passband for the receiver 240, the tones should be within a narrower range, for example, 500 Hz to 2,650 Hz, in order to compensate for up to 150 Hz drift. The optimum number of tone frequencies would be obtained if the cutoff frequency of the low-pass filter 270 would be about one half of the uppermost frequency. Therefore, if the uppermost frequency was 2,650 Hz, the theoretical optimum cutoff frequency of the low-pass filter 270 would be 1,325 Hz. If, as is preferable, one tone in each pair of tones always has the same frequency of, say, 2,650 Hz, then the other tones should be selected from within the range of 1,325 Hz (the cutoff frequency of the low-pass filter 270) and 2,150 Hz (assuming the lower end of the receiver passband is 500 Hz). Of course, because the filter 270 is not perfect, the cutoff frequency may have to be somewhat less than 1,325 Hz. By selecting tones from within the range of 1,325 Hz and 2,150 Hz, all difference frequency signals would fall within the range of 500 Hz to 1,325 Hz.

It should be understood that the instant communication system enables the tones to have frequencies within the voice spectrum and yet not interfere with the voice message because the tones are transmitted before the voice message commences and an electronic switch circuit has timing means to render operative the audio circuit beyond termination of the tones.

In one form of the invention the tone extractor 260 had the following parts: diodes 262, 263, 264, 265, 266, and 267 were silicon diodes; resistor 271 and 220 kilohms; capacitor 272 was 5.5 microfarads; resistors 273 and 275 were 22 kilohms; capacitor 274 was 0.047 microfarads; inductors 276 and 283 were 3 henries; capacitors 277 and 278 were 8.2 microfarads; resistor 279 was 10 kilohms; capacitors 280 and 285 were 0.01 microfarads; resistor 282 was 5.6 kilohms; capacitor 284 was 0.147 microfarads; resistor 288 was 100 kilohms; resistor 289 was 470 ohms; capacitor 290 was 33 microfarads.

In order to maximize the number of tones available for a selective calling system, it may be desirable to add a multiplier circuit to the output of the tone extractor 260, which multiplier may be of a standard construction. Preferably, the multiplier would be a frequency doubler, so that, if, for example, the frequency were 1,000 Hz, the multiplier would produce a signal with a frequency of 2,000 Hz. Thus, if the spread of frequencies from the tone extractor 260 were 500 Hz to 1,350 Hz, the doubler would increase the frequency range from 1,000 Hz to 2,700 Hz; that is a 1,700 Hz spread, as opposed to an 850 Hz spread. This would effectively increase the number of tones which can be transmitted and received in the system.

It is believed that the invention, its mode of construction and assembly, and many of its advantages should be readily understood from the foregoing without further description, and it should also be manifest that, while preferred embodiments of the invention have been shown and described for illustrative purposes, the structural details are, nevertheless, capable of wide variation within the purview of the invention, as defined in the appended claims.

What is claimed is:

1. A communication system comprising a transmitter for transmitting modulated signals including a sequence of a plurality of pairs of simultaneous tones respectively lasting for predetermined durations and an intelligence message following the last pair of simultaneous tones, one tone in each of said pairs of simultaneous tones having the same frequency; a receiver including a processing circuit for receiving the incoming signals and detecting the tones and the intelligence message therein, an output circuit coupled to said processing circuit and including a transducer for converting the intelligence message, a mixer coupled to said processing circuit for sequentially mixing the pairs of tones to provide a sequence of a plurality of pairs of mixed signals, each pair of mixed signals having frequencies respectively equal to the sum and the difference of the frequencies of the tones in said pairs of tones, a low-pass filter coupled to said mixer and having a cutoff frequency to pass only the difference frequency mixed signals, circuit means including a plurality of tuned circuits coupled to said mixer and respectively tuned to the frequencies of said difference frequency mixed signals and responsive to the presence sequentially thereof to provide an output signal, and electronic switching means coupled to said circuit means and responsive to the output signal for providing an enabling signal which extends beyond termination of the tones in the last pair of tones, said audio circuit being coupled to said electronic switching means and being rendered operative in the presence of said enabling signal to furnish an output in accordance with the intelligence message and rendered inoperative in the absence of said enabling signal.

2. The communication system set forth in claim 1, wherein said transmitter includes one oscillator which furnishes a substantially continuous tone, which tone constitutes said one tone in each of said pairs of simultaneous tones.

3. A communication receiver for receiving modulated incoming single side-band signals including at least two simultaneous tones lasting for a predetermined duration followed by an intelligence message within the voice spectrum, the tones having frequencies selected from a first portion of the voice spectrum, said receiver comprising a processing circuit for receiving the incoming signals and detecting the tone and the intelligence message therein, an output circuit coupled to said processing circuit and including a transducer for converting the intelligence message, a mixer coupled to said processing circuit for mixing the tones to provide a difference-frequency signal having a frequency equal to the difference between the frequencies of the tones, a tuned circuit coupled to said mixer and tuned to a frequency selected from a second different portion of the voice spectrum, said tuned circuit providing an output signal in response to a signal from said mixer having a frequency to which the tuned circuit is tuned, and electronic switching means coupled to said tuned circuit and responsive to the output signal for providing an enabling signal which extends beyond termination of the tones, said output circuit being coupled to said electronic switching means and being operative in the presence of said enabling signal to furnish an output representation of the intelligence message and inoperative in the absence of said enabling signal.

4. A communication system comprising a single side-band transmitter including means for transmitting modulated single side-band signals including at least two simultaneous tones lasting for a predetermined duration followed by an intelligence message within the voice spectrum, the tones having frequencies selected from a first portion of the voice spectrum; and a receiver including a processing circuit for receiving the modulated single side-band signals and detecting the tones in the intelligence message therein, an output circuit coupled to said processing circuit and including a transducer for converting the intelligence message, a mixer coupled to said processing circuit for mixing the tones to provide a difference frequency signal having a frequency equal to the difference between the frequencies of the tones, a tuned circuit coupled to said mixer and tuned to a frequency selected from a second different portion of the voice spectrum, said tuned circuit providing an output signal in response to a signal from said mixer having a frequency to which the tuned circuit is tuned, and electronic switching means coupled to said tuned circuit and responsive to the output signal for providing an enabling signal which extends beyond termination of the tones, said output circuit being coupled to said electronic switching means and being operative in the presence of said enabling signal to furnish an output representation of the intelligence message and inoperative in the absence of said enabling signal.

5. The communication system set forth in claim 4, wherein the frequency of one of the tones produced by said transmitter is fixed.

6. The communication system set forth in claim 4, wherein the frequency of one of the tones produced by said transmitter is fixed and is adjacent to the high end of the voice spectrum.

7. The communication system set forth in claim 4, wherein the first portion is in the upper half of the voice spectrum and the second portion in the lower half of the voice spectrum.

8. A communication receiver for receiving modulated incoming single side-band signals including at least two simultaneous tones lasting for a predetermined duration followed by an intelligence message within the voice spectrum, the tones having frequencies within the voice spectrum and greater than a predetermined frequency therein, the reference in frequency between the tones being within the voice spectrum and less than the predetermined frequency, said receiver comprising a processing circuit for receiving the incoming signals and detecting the tones and the intelligence message therein, an output circuit coupled to said processing circuit and including a transducer for converting the intelligence message, a mixer coupled to said processing circuit for mixing the tones to provide a difference frequency signal having a frequency equal to the difference between the frequencies of the tones, a low-pass filter coupled to said mixer and having a cutoff frequency substantially equal to the predetermined frequency in the voice spectrum so as to pass the difference frequency signal from the mixer and not the tones, a turned circuit coupled to said mixer and providing an output signal in response to a signal from said mixer having a frequency to which the tuned circuit is tuned, and electronic switching means coupled to said tuned circuit and responsive to the output signal for providing an enabling signal which extends beyond termination of the tones, said output circuit being coupled to said electronic switching means and being operative in the presence of said enabling signal to furnish an output representation of the intelligence message and inoperative in the absence of said enabling signal.

9. The communication system set forth in claim 8, wherein the cutoff frequency of said low-pass filter is approximately centered in the voice spectrum.

10. A communication system comprising a single side-band transmitter for transmitting modulated single side-band signals including at least two simultaneous tones lasting for a predetermined duration followed by an intelligence message within the voice spectrum, the tones having frequencies in the voice spectrum and greater than a predetermined frequency therein, the difference in frequency between the tones being within the voice spectrum and less than the predetermined frequency, a receiver comprising a processing circuit for receiving the incoming signals and detecting the tones and the intelligence message therein, an output circuit coupled to said processing circuit and including a transducer for converting the intelligence message, a mixer coupled to said processing circuit for mixing the tones to provide a difference frequency signal having a frequency equal to the difference between the frequencies of the tones, a low-pass filter coupled to said mixer and having a cut-off frequency substantially equal to the predetermined frequency in the voice spectrum so as to pass the difference frequency signal from the mixer and not the tones, a tuned circuit coupled to said mixer and providing an output signal in response to a signal from said mixer having a frequency to which the tuned circuit is tuned, and electronic switching means coupled to said tuned circuit and responsive to the output signal for providing an enabling signal which extends beyond termination of the tones, said output circuit being coupled to said electronic switching means and being operative in the presence of said enabling signal to furnish an output representation of the intelligence message and inoperative in the absence of said enabling signal.

* * * * *

UNITED STATES PATENT OFFICE

CERTIFICATE OF CORRECTION

Patent No. 3,771,060 Dated November 6, 1973

Inventor(s) Keith H. Wycoff

It is certified that error appears in the above-identified patent and that said Letters Patent are hereby corrected as shown below:

Col. 4, line 19, "of", first occurrence, should be -- and --. Col. 5, line 17, "142" should be -- 141 --; line 21, "resistor" should be -- resistors --. Col. 10, line 17, "Also, the reference circuit 310 includes" should be deleted; line 18, "a" first ooccurrence, should be -- A --; line 18, "which" should be deleted. Col. 11, line 5, "thereof" should be -- difference therebetween --; lines 18 and 19, "the B+ voltage (approximately) should be -- an output signal --; line 20, "feed-back" should be -- feedback --. Col. 12, line 10, "400" should be -- 300 --; line 34, "245" should be -- 299 --. Col. 14, line 5, "and" second occurrence, should be -- was --; line 66, "audio" should be -- output --. Col. 15, line 17, "tone" should be -- tones --. Col. 16, line 15, "reference" should be -- difference --; line 30, "turned" should be -- tuned --.

Signed and sealed this 4th day of June 1974.

(SEAL)
Attest:

EDWARD M.FLETCHER,JR.
Attesting Officer

C. MARSHALL DANN
Commissioner of Patents